US008066043B2

(12) United States Patent
Leist

(10) Patent No.: US 8,066,043 B2
(45) Date of Patent: Nov. 29, 2011

(54) COMBINATION FOREST BIOMASS AND TREE HARVESTER, HARVESTING HEAD ASSEMBLY, AND METHODS FOR HARVESTING

(75) Inventor: James R. Leist, Colombus, MS (US)

(73) Assignee: Weyerhaeuser NR Company, Federal Way, WA (US)

( * ) Notice: Subject to any disclaimer, the term of this patent is extended or adjusted under 35 U.S.C. 154(b) by 212 days.

(21) Appl. No.: 12/647,709

(22) Filed: Dec. 28, 2009

(65) Prior Publication Data

US 2011/0155283 A1    Jun. 30, 2011

(51) Int. Cl.
*A01G 23/08* (2006.01)
(52) U.S. Cl. ............... 144/336; 144/4.1; 144/34.1
(58) Field of Classification Search ........... 144/4.1, 144/34.1, 335, 336; 30/122, 134; 414/739, 414/740; 56/10.7, 13.5–13.7, 14.3, 17.3, 56/233–235
See application file for complete search history.

(56) References Cited

U.S. PATENT DOCUMENTS

| | | | |
|---|---|---|---|
| 4,175,598 A | 11/1979 | Stoychoff | |
| 4,763,742 A | 8/1988 | Langford | |
| 4,909,291 A | 3/1990 | Tremblay | |
| 5,964,262 A | 10/1999 | Corley | |
| 6,363,980 B1 | 4/2002 | Kurelek | |
| 6,668,880 B2 * | 12/2003 | Nordstrom | 144/4.1 |
| 2009/0090058 A1 | 4/2009 | Dam-Johansen et al. | |
| 2009/0242077 A1 * | 10/2009 | Prohaska | 144/4.1 |

OTHER PUBLICATIONS

Spinelli, Raffaele; Cuchet, Emmanuel; Roux, Philippe, "A new feller-buncher for harvesting energy wood: Results from a European test programme," ScienceDirect, Biomass and Bioenergy 31 (2007) 205-210, Nov. 20, 2006, Elsevier Ltd, online at www.sciencedirect.com.
Rottensteiner, Christian; Affenzeller, Gunter; Stampfer, Karl, "Evaluation of the Feller-Buncher Moipu 400E for Energy Wood Harvesting", Croat. J. for Eng. 29(2008)2, Jul. 18, 2008, Croatia.
Rummer, Bob, "Harvesting and Transportation of Forest Biomass", US Forest Service, http://www.safnet.org/fp/documents/harvesting_and_Transportation_biomass_07.pdf, 2008.
Frederick, Douglas J.; Stokes, Bryce J.; Curtin, Dennis T., "Field Trials of a Canadian Biomass Feller Buncher", US Department of Agriculture, Forest Service, Southern Forest Experiment Station, New Orleans, Louisiana, Proceedings of the Southern Forest Bianass [sic] Workshop, Jun. 11-14, 1985.

* cited by examiner

*Primary Examiner* — Shelley Self
(74) *Attorney, Agent, or Firm* — Rachael Vaughn

(57) ABSTRACT

The disclosure relates to a combination forest biomass and tree harvester, a harvesting head assembly, and methods for harvesting trees and forest biomass. In some embodiments, the combination forest biomass and tree harvester includes a self-propelled vehicle base, a moveable arm, and a harvesting head assembly. The harvesting head assembly may include a frame member, a grabbing assembly, and a cutting assembly. The cutting assembly may include a primary cutting mechanism and a secondary cutting mechanism. As the combination forest biomass and tree harvester moves through a forest area, the cutting assembly may be used to cut trees and mow biomass.

20 Claims, 4 Drawing Sheets

US 8,066,043 B2

COMBINATION FOREST BIOMASS AND TREE HARVESTER, HARVESTING HEAD ASSEMBLY, AND METHODS FOR HARVESTING

TECHNICAL FIELD

The present disclosure is directed generally to a combination forest biomass and tree harvester, a harvesting head assembly and methods for using the harvester and the harvesting head assembly to harvest forest biomass and trees in a forest area.

BACKGROUND

Recent technical developments for utilizing biomass as an alternative energy source have presented a number of promising opportunities for the forestry industry. Forest biomass generally includes any plant or tree material produced by forest growth. A key challenge in using forest biomass for energy production is getting feedstock harvested, processed, and transported at reasonable costs. Efficient feedstock harvesting methods should ideally match the unique requirements of each source. For example, logging residue collection could be accomplished by integrating biomass processing into a conventional logging operation. Understory biomass and small woody species present special problems that are not readily overcome with existing harvesting methods. A wide range of new technology is currently being developed to address these harvesting challenges.

Current traditional harvesting technology includes the following primary functions: felling, primary transport, processing, and highway transport. Two basic felling methods include manual felling (e.g., chainsaw) and mechanized felling (e.g., feller-buncher, swath cutting). A piece of mechanized felling equipment is typically referred to as a harvester.

Many equipment manufacturers are investigating the prospects of modifying conventional harvesters for cutting and/or gathering forest biomass. An example of work that is being done in the area is described in a paper published by Elseivier Ltd., which is hereby incorporated by reference. Raffaele Spinelli & Emmanuel Cuchet & Phillippe Roux, *A new feller-buncher for harvesting energy wood: Results from a European test programme* (2006). In addition, specialized harvesting equipment is also being developed for biomass applications. An example of such equipment is described in U.S. Published Patent Application No. 2009/0242077 A1, which is hereby incorporated by reference.

Most biomass harvesters—whether developed from existing equipment or specialized biomass technology—are limited to the sole functionality of harvesting forest biomass. There is an opportunity to improve current technology by expanding the functionality of biomass harvesting equipment to include the capabilities of traditional harvesters (e.g., tree cutting) in one piece of equipment. Thus, there is a need to develop new systems and methods for biomass harvesting, which combine the functionality of conventional harvesting equipment with equipment suited for the harvesting challenges posed by forest biomass.

SUMMARY

The following summary is provided for the benefit of the reader only and is not intended to limit in any way the invention as set forth by the claims. The present disclosure is directed generally towards a combination forest biomass and tree harvester, a harvesting head assembly and methods for using the harvester and the harvesting head assembly to harvest forest biomass and trees in a forest area.

In some embodiments, the disclosure includes a combination forest biomass and tree harvester comprising a self-propelled vehicle base, a moveable arm attached to the self propelled vehicle base, and a harvesting head assembly. The harvesting head assembly may include a frame member, a grabbing assembly, and a cutting assembly. The cutting assembly may include a primary cutting mechanism and a secondary cutting mechanism. In some embodiments, the grabbing assembly may include a pair of primary grabber arms and a pair of secondary grabber arms.

Further aspects of the disclosure are directed towards methods for harvesting forest biomass and trees using embodiments of the combination forest biomass and tree harvester. In some embodiments, harvesting methods include moving the self-propelled vehicle base through a forest area, cutting trees with the primary cutting mechanism and mowing forest biomass. The step of mowing forest biomass may be accomplished by continuously rotating the secondary cutting mechanism. In addition, the primary cutting mechanism may also be utilized for mowing purposes.

BRIEF DESCRIPTION OF THE DRAWINGS

The present disclosure is better understood by reading the following description of non-limitative embodiments with reference to the attached drawings wherein like parts of each of the figures are identified by the same reference characters, and are briefly described as follows.

DETAILED DESCRIPTION

The present disclosure describes a combination forest biomass and tree harvester, a harvesting head assembly and methods for using the harvester and the harvesting head assembly to harvest forest biomass and trees in a forest area. Certain specific details are set forth in the following description and FIGS. 1, 3, and 4 to provide a thorough understanding of various embodiments of the disclosure. Well-known structures, systems, and methods often associated with such systems have not been shown or described in details to avoid unnecessarily obscuring the description of various embodiments of the disclosure. In addition, those of ordinary skill in the relevant art will understand that additional embodiments of the disclosure may be practiced without several of the details described below.

In this disclosure, the term "wood" is used to refer to any organic material produced from trees, shrubs, bushes, grasses or the like. The disclosure is not intended to be limited to a particular species or type of wood. The term "biomass" is used to refer to a renewable energy source that is a biological material derived from living or recently living organisms. The term "forest biomass" is used to describe any type of biomass produced by forest growth such as dead trees, non-merchantable trees, branches, understory, tree stumps, clipping, logging residue, stems, wood chips, or other similar material.

A feller-buncher is a standard type of harvester used in traditional forestry operations. Although many different types of feller-bunchers are commercially available, most feller-bunchers can be characterized as self-propelled machines designed to fell standing trees and arrange them in bunches on the ground. A typical feller-buncher consists of a standard heavy equipment base and a harvesting head. The harvesting head includes a tree-grabbing device furnished with a cutting device. As the base moves through the forest, the cutting device is manipulated by an operator to cut trees. After the cutting device severs the tree at the base, the tree-grabbing device arranges the cut tree into a bunch that is suitable for transport for further processing (e.g., delimbing, bucking, loading, or chipping).

Figure 1:
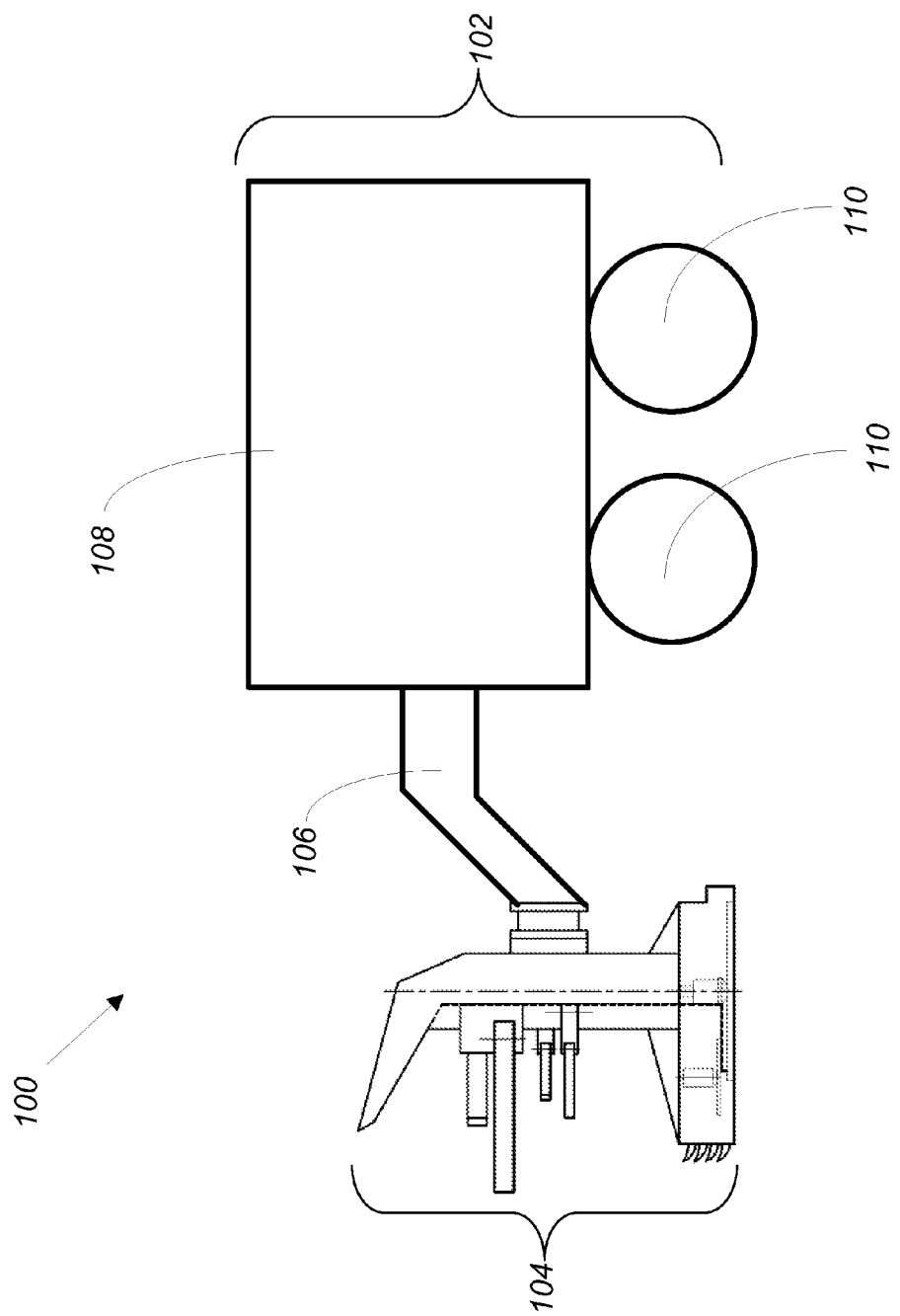
FIG. 1 is a schematic of a combination tree and biomass harvester in accordance with embodiments of the disclosure.

FIG. 1 is a schematic of a combination tree and biomass harvester 100 in accordance with embodiments of the disclosure. The combination tree and biomass harvester 100 is based on a traditional feller-buncher design; however, the scope of the disclosure is not limited to traditional feller-buncher designs. Aspects of the disclosure may be incorporated as modifications to other types of harvesters to enable both traditional tree harvesting and biomass harvesting with the same piece of equipment. The main components of the combination tree and biomass harvester include a self-propelled vehicle base 102, a harvesting head assembly 104, and a moveable arm 106 attaching the harvesting head assembly 104 to the self-propelled vehicle base 102.

The self-propelled vehicle base 102 is not described in detail in this disclosure because it may be any type of vehicle known to a person of ordinary skill in the art or any type of vehicle that is suitable for harvesting operations described in the disclosure. In FIG. 1, the self-propelled vehicle base includes a prime mover 108 having a movement mechanism 110. The prime mover 108 may include a cab (not explicitly shown) or any other type of housing device that is suitable to contain the mechanical and electrical equipment needed to operate the self-propelled vehicle 102. Optionally the prime mover 108 may also provide accommodation for one or more human operators. The movement mechanism 110 may include wheels, treads, or any other device suitable for moving the self-propelled vehicle 102 over terrain that may be encountered during harvesting operations. The prime mover 108 may also be articulated for greater turning ability. Examples of standard features which may be included in the prime mover 108 are described, for example, in U.S. Pat. No. 6,267,195, which is hereby incorporated by reference.

The moveable arm 106 is also not described in detail in this disclosure because it is a standard piece of equipment that is included in most conventional feller-bunchers. The moveable arm 106 connects the harvesting head 104 to the self-propelled vehicle 102. The moveable arm 106 may be extended in various directions, bent, rotated, or otherwise manipulated during operation. The harvesting head assembly 104 may be pivotably mounted or otherwise attached to the moveable arm 106 to enable movement of the harvesting head assembly 104 between different orientations. The moveable arm 106 may be a boom assembly or parallelogram set up to lift and lower the head. Examples of standard features which may be included in the prime mover 108 are described, for example, in U.S. Pat. No. 6,249,994, which is hereby incorporated by reference.

Figure 2:
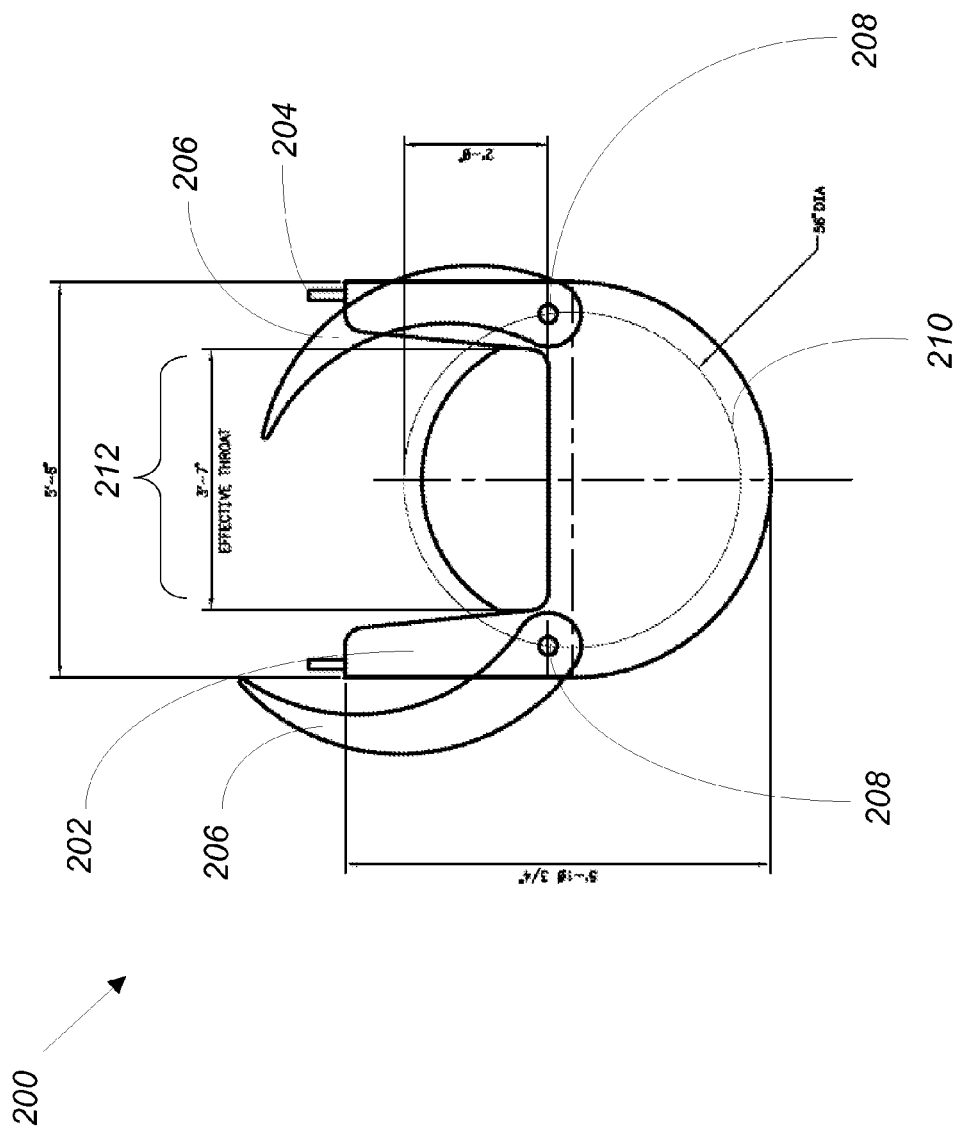
FIG. 2 is an elevation view of a harvesting head assembly on a conventional feller-buncher.

Embodiments of the harvesting head assembly 104 are described in further detail later in this disclosure and in FIGS. 3 and 4. In FIG. 2, a conventional harvesting head assembly is shown and described. FIG. 2 is an elevation view of a typical configuration of a harvesting head 200 used in a conventional feller-buncher. The harvesting head 200 includes a substantially U-shaped tree-carrying frame 202 and a base 204 constructed from metal components. Tree-grabbing devices 106 are connected to a mid portion of the frame 202 at pivot points 208. The tree-grabbing devices 206 typically include two grabbing arms which are suitable for holding, stabilizing, collecting and/or grabbing trees having diameters which range from about 2 inches to about 30 inches. A cutting device (e.g., saw disc, chain saw, shear device) 210 is mounted on a lower portion of the frame 202. The cutting device 210 typically has a diameter of approximately 56 inches, resulting in a throat opening 212 of approximately 22 inches.

Figure 3:
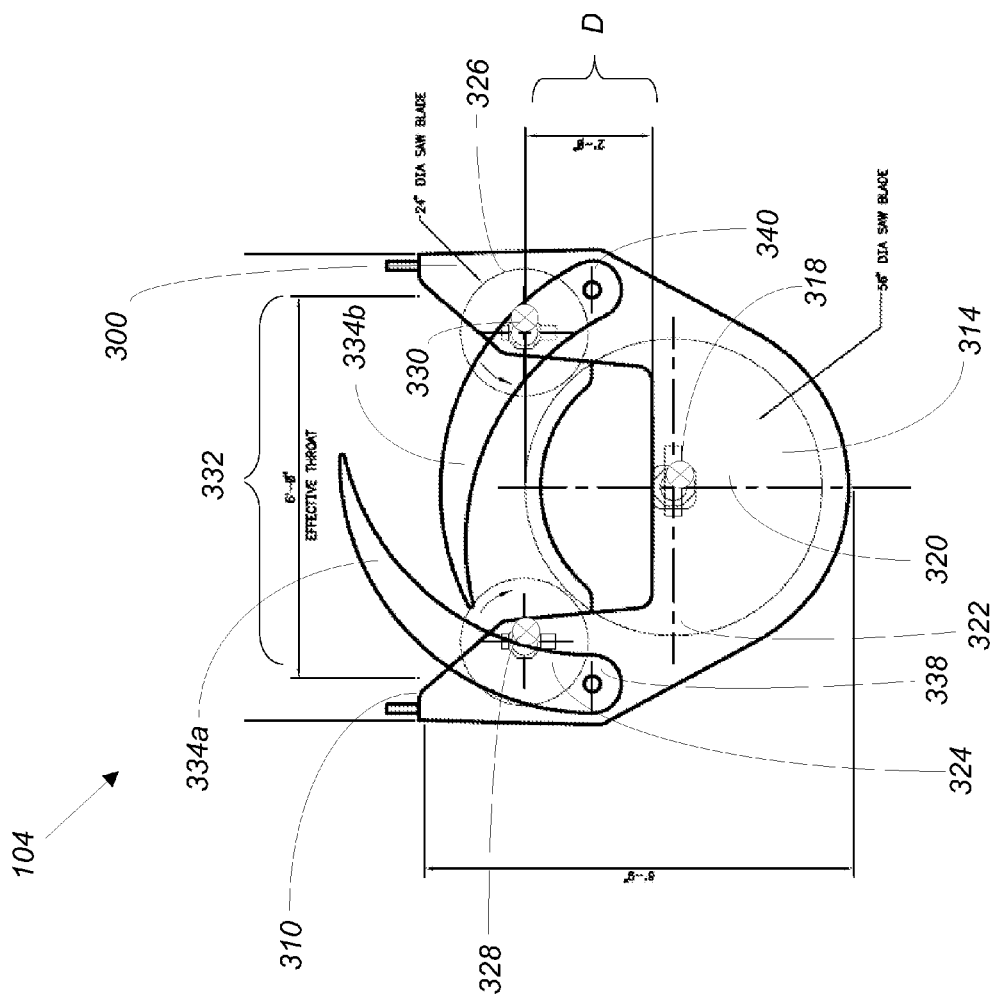
FIG. 3 is an elevation view of a harvesting head assembly in accordance with embodiments of the disclosure.
Figure 4:
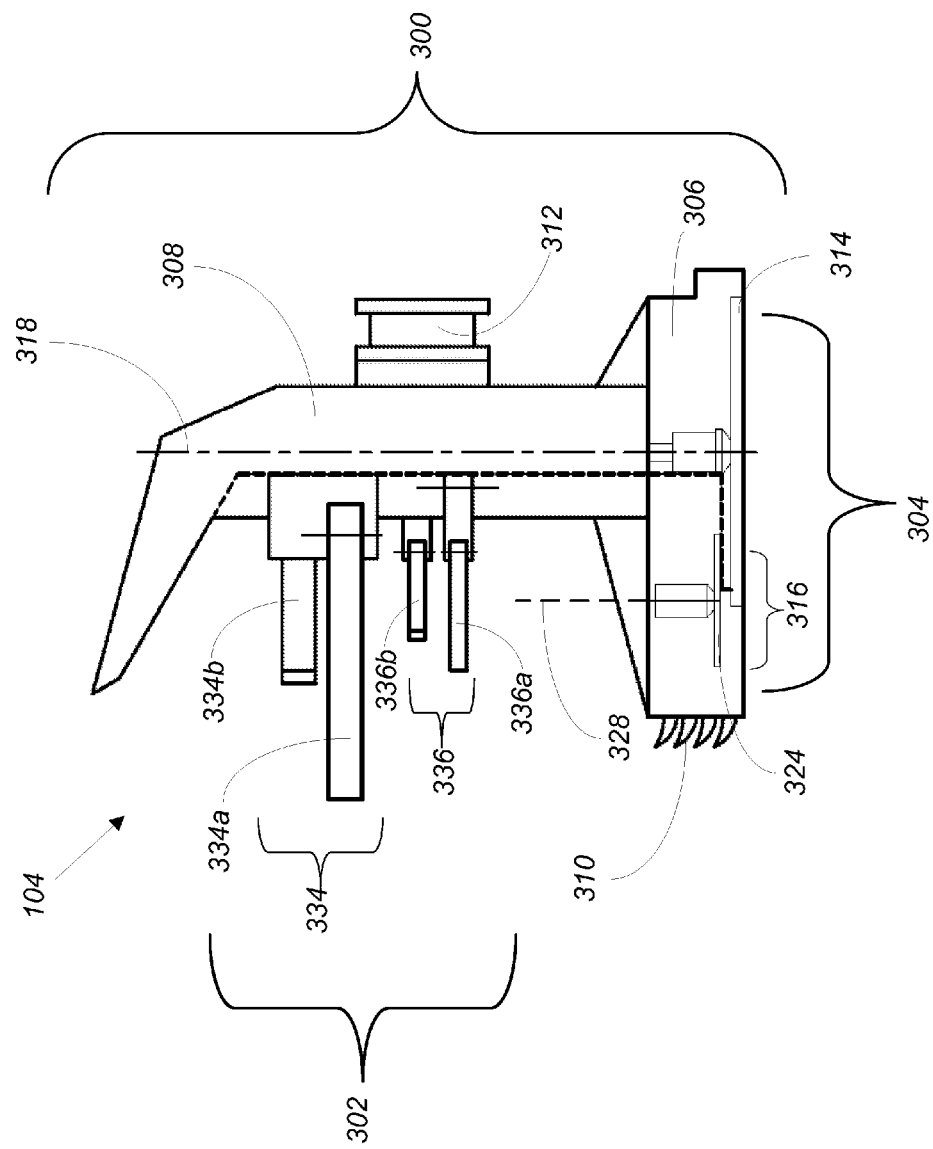
FIG. 4 is a side view of a harvesting head assembly in accordance with embodiments of the disclosure.

FIGS. 3 and 4 illustrate further details of embodiments of the harvesting head assembly 104 from FIG. 1. FIG. 3 is an elevation view of the harvesting head assembly 104 in accordance with embodiments of the disclosure. FIG. 4 is a side view of the harvesting head assembly 104 in accordance with embodiments of the disclosure. As shown most clearly in FIG. 4, the harvesting head assembly 104 comprises a frame member 300, a grabbing assembly 302, and a cutting assembly 304.

The frame member 300 may be constructed from any substantially rigid material known to a person of ordinary skill in the art. The frame member 300 may constructed to be any suitable shape including the U-shape shown in FIG. 2. In some embodiments, the frame member 300 may consist of a base portion 306 and a main portion 308, the main portion 308 being arranged substantially perpendicular to the base portion 306. The base portion 306 may be equipped with grippers 310, which are used to stabilize the harvesting head 104 while in operation. An attachment member 312 is shown in FIG. 4 connected to the frame member 300. Referring back to FIG. 1, the harvesting head 104 is connected to the self-propelled vehicle 102 via the moveable arm 106. The attachment member 312 may be used to mount the harvesting head 104 on the moveable arm 106 and to position the harvesting head 104 during operation. For example, the moveable arm 106 may manipulate the harvest head assembly between positions where the base portion 306 of the frame member 300 is substantially parallel to the ground of the forest area, positions where the base portion 306 is substantially perpendicular to the ground of the forest area, and intermediate positions.

Referring back to FIGS. 3 and 4, the cutting assembly 304 comprises a primary cutting mechanism 314 and a secondary cutting mechanism 316. The primary cutting mechanism 314 may be designed for traditional forestry operations such as harvesting large trees. The primary cutting mechanism is positioned on a center axis 318. In FIG. 3, the center axis 318 extends out of the page, marking the intersection of a vertical axis shown by a dotted line 320 and a horizontal axis shown by a dotted line 322. In some embodiments, the primary cutting mechanism 314 is a saw disc mounted on the base portion 306 of the frame member 300, defining a plane that is substantially perpendicular to the center axis 318. In some embodiments, the primary cutting mechanism 314 is a saw disc having a diameter of approximately 56 inches. The primary cutting mechanism 314 may rotate in either a clockwise direction or a counter clockwise direction at a speed of approximately 1000 RPM. Although FIGS. 3 and 4 depict the primary cutting mechanism 314 as a saw disc, other cutting mechanisms known to a person of ordinary skill in the art that are suitable for cutting trees may be used in place of a saw disc.

In addition to the primary cutting mechanism 314, the cutting assembly 304 further includes the secondary cutting mechanism 316. In some embodiments, the secondary cutting mechanism 316 is mounted on the base portion 306 of the frame member 300 in an orbital configuration around the primary cutting mechanism 314. Whereas the primary cutting mechanism 314 is suitable for cutting larger trees, the secondary cutting mechanism 316 is designed for harvesting forest biomass or smaller trees.

In FIGS. 3 and 4, the secondary cutting mechanism 316 comprises two saw discs which have a substantially smaller diameter than the diameter of the saw disc used as the primary cutting mechanism 314. As best shown in FIG. 3, a first orbital saw disc 324 and a second orbital saw disc 326 are arranged in a plane parallel to the primary cutting mechanism 314 in an orbital configuration around the circumference of the primary cutting mechanism 314. As shown in FIG. 3, the first orbital saw disc 324 is positioned at approximately the ten o'clock position on the circumference of the primary cutting mechanism 314. The second orbital saw disc 326 may be positioned at approximately the two o'clock position. Other configurations not shown in FIG. 3 are also within the scope of the disclosure.

In some embodiments, the first orbital saw disc 324 and the second orbital saw disc 326 each have a diameter equal to approximately 10 inches to approximately 30 inches. In the embodiment shown in FIGS. 3 and 4, the primary cutting mechanism 314 has a diameter of approximately 56 inches; however, the primary cutting mechanism 314 and the secondary cutting mechanism 316 may be designed to have other dimensions in accordance with weight and operation requirements without departing from the scope of this disclosure. The first orbital saw disc 324 is positioned on a first orbital axis 328 and the second orbital saw disc 326 is positioned on a second orbital axis 330. The first orbital axis 328, the second orbital axis 330 and the center axis 318 are all substantially parallel. Although FIGS. 3 and 4 depict the secondary cutting mechanism 316 as a saw discs, other cutting mechanisms known to a person of ordinary skill in the art that are suitable for harvesting forest biomass may be used in place of the first orbital saw disc 324 and the second orbital saw disc 326.

As best shown in FIG. 4, in some embodiments, the secondary cutting mechanism 316 may be arranged directly above the primary cutting mechanism 314. In other embodiments, there may be a gap between the primary cutting mechanism 314 and the secondary cutting mechanism 316. As best shown in FIG. 3, the distance D between the center axis 318 and the first orbital axis 328 and/or the second orbital axis 330 may be approximately 2 feet. The distance D may vary in other embodiments. In some embodiments, the center axis 318, first orbital axis 328, and second orbital axis 330 may all be arranged on the horizontal axis 322 so that the distance D is effectively 0.

In operation, the primary cutting mechanism 314 and the secondary cutting mechanism 316 continuously rotate to enable both cutting of trees and harvesting of forest biomass. Thus, in some embodiments, the primary cutting mechanism 314 and the secondary cutting mechanism 316 function together as a single mowing mechanism. As described above, the primary mechanism 314 may rotate in any direction. In some embodiments, the first orbital saw disc 324 rotates in a clockwise direction and the second orbital saw disc 326 rotates in a counter clockwise direction. In the embodiment shown in FIG. 3, the combined effective throat opening 332 for the harvesting head assembly 104 (combining both the primary cutting mechanism 314 and the secondary cutting mechanism 316) is approximately 6 feet, 9 inches. Harvesting head assemblies 104 according to embodiments of the disclosure may have effective throat openings 332 which range anywhere from approximately 3 feet to approximately 7 feet. Preferably, the effective throat opening 332 is larger than approximately 6 feet.

The grabbing assembly 302 is attached to the main portion 308 of the frame member 300 so that it is located above the cutting assembly 304. As best shown in FIG. 4, in some embodiments, the grabbing assembly 302 includes a pair of primary grabber arms 334 (e.g., a first grabber arm 334a and a second grabber arm 334b) and a pair of secondary grabber arms 336 (e.g., a third grabber arm 336a and a fourth grabber arm 336b). In the embodiment shown in FIG. 4, the primary grabber arms 334 are substantially larger in size than the secondary grabber arms 336. Thus, the primary grabber arms 334 are suitable for holding, collecting, and/or grabbing larger material such as trees. In some embodiments, the secondary grabber arms 336 are more suitable for holding, collecting and/or grabbing forest biomass.

Both the primary grabber arms 334 and the secondary grabber arms 336 are moveable between an open position, a closed position, and intermediate positions between the open position and the closed position. FIG. 3, for example, shows the primary grabbing arms 334 (e.g., the first grabber arm 334a and the second grabber arm 334b) in an intermediate position. As shown, the first grabber arm 334a is moveable about a first pivot point 338 and the second grabber arm 334b is moveable about a second pivot point 340. Referring to FIG. 4, the third grabber arm 336a and fourth grabber arms 336b are also moveable about pivot points which are not visible in the Figure. The primary grabber arms 334 and the secondary grabber arms 336 are both spring mounted so that, for example, the first grabber arm 334a may move independently from the second grabber arm 334b. The primary grabber arms 334 and the secondary grabber arms 336 may also be manufactured in different sizes without departing from the spirit of the disclosure.

The following portion of the disclosure will describe methods for operating embodiments of the combination tree and forest biomass harvester 100. Referring back to FIG. 1, the self-propelled vehicle 102 may be operated by a human or remotely operated. As the combination tree and forest biomass harvester 100 moves through a forest area, the moveable arm 106 is held in a fixed position and the cutting assembly 304 (see FIGS. 3 and 4) is used to effectively mow forest biomass. Alternatively, the moveable arm 106 may be positioned to more effectively mow the forest biomass. Referring again to FIGS. 3 and 4, the primary cutting mechanism 314 and/or the secondary cutting mechanism 316 may perform this mowing function by continuously rotating as the self-propelled vehicle 102 moves.

After the forest biomass is harvested, the grabbing assembly 302 may be used to collect the forest biomass and accumulate it into bunches. In some embodiments, the smaller secondary grabber arms 336 may be more effective for this purpose. In other embodiments, it may be appropriate to utilize the larger primary grabber arms 334 for this function. The bunches may be laid on the ground in the forest area for subsequent gathering by standard machinery known to a person of ordinary skill in the art. In other embodiments, the forest biomass is simply moved and is not accumulated or bunched.

As the combination forest biomass and tree harvester 100 moves through the forest area mowing forest biomass, it may encounter larger standing trees which are appropriate for harvesting, When such a tree is encountered, the moveable arm 106 (FIG. 1) is extended to bring the cutting assembly 304 (FIG. 3) in contact with the tree. The grippers 310 shown in FIG. 3 may be used to stabilize the frame member 300 as the primary cutting mechanism 314 severs the tree. The grabbing assembly 302 may also be opened and brought into engagement with the tree to provide further stabilization during cutting. After the tree is cut, it may be lifted by one or both of the primary grabbing arms 334 and set in a resting position on the base portion 306 of the frame member 300. The self-propelled vehicle 102 may continue to move while mowing forest biomass. After more trees are collected, they may be arranged in bunches and placed on the forest ground for subsequent collection by standard machinery known to a person of ordinary skill in the art.

Some embodiments of the disclosure are expected to be more efficient in harvesting trees and forest biomass than current equipment used for this purpose. Whereas traditional equipment is generally used to harvest forest biomass by cutting, embodiments of the disclosure offer the capability of mowing forest biomass. Embodiments of the disclosure may achieve this increased efficiency because of the capability to perform traditional foresting operations in addition to biomass harvesting operations. The width and effective throat opening of the harvesting head 104 are expected to optimize productivity of these two functions.

From the foregoing, it will be appreciated that the specific embodiments of the disclosure have been described herein for purposes of illustration, but that various modifications may be made without deviating from the disclosure. For example, the cutting assembly 304 is generally described as comprising saw discs. The scope of this disclosure includes other types of equipment that a person of ordinary skill in the art would use in place of a saw disc (e.g., a chain saw, a shear device). Although FIGS. 1, 3, and 4 generally show embodiments of secondary cutting mechanisms 316 comprising two saw discs arranged in a particular manner, a different number of saw discs arranged in a different configuration may be used. In addition, the cutting assembly 304 and the grabbing assembly 302 may be used in manners not explicitly described in the disclosure that would be known to a person or ordinary skill in the art.

Aspects of the disclosure described in the context of particular embodiments may be combined or eliminated in other embodiments. Further, while advantages associated with certain embodiments of the disclosure may have been described in the context of those embodiments, other embodiments may also exhibit such advantages, and not all embodiments need necessarily exhibit such advantages to fall within the scope of the disclosure. Accordingly, the invention is not limited except as by the appended claims.

I claim:

1. A combination forest biomass and tree harvester comprising:
   a self-propelled vehicle base;
   a moveable arm attached to the self propelled vehicle base; and
   a harvesting head assembly connected to the moveable arm, the harvesting head assembly comprising:
      a frame member comprising a base portion and a main portion;
      a grabbing assembly attached to the main portion of the frame member, the grabbing assembly being configured for grabbing trees or forest biomass; and
      a cutting assembly attached to the base portion of the frame member, the cutting assembly comprising:
         a primary cutting mechanism positioned on a center axis, the primary cutting mechanism being configured to cut trees; and
         a secondary cutting mechanism positioned in an orbital configuration around the primary cutting mechanism, the secondary cutting mechanism being configured to mow forest biomass;
      wherein the center axis is substantially perpendicular to the base portion of the frame member.

2. The combination forest biomass and tree harvester of claim 1 wherein the primary cutting mechanism and the secondary cutting mechanism are configured to provide an effective throat opening between approximately 3 feet and approximately 7 feet.

3. The combination forest biomass and tree harvester of claim 1 wherein the primary cutting mechanism comprises a primary saw disc attached to the base portion of the frame member, the primary saw disc having a primary circumference.

4. The combination forest biomass and tree harvester of claim 3 wherein the secondary cutting mechanism comprises:
   a first orbital saw disc having a first circumference, the first orbital saw disc being positioned on a first axis; and
   a second orbital saw disc having a second circumference, the second orbital saw disc being positioned on a second axis;
   wherein the first circumference and the second circumference are both smaller than the primary circumference;
   wherein the first axis is substantially parallel to the center axis; and
   wherein the second axis is substantially parallel to the center axis.

5. The combination forest biomass and tree harvester of claim 1 wherein the primary cutting mechanism is also configured to continuously rotate and mow forest biomass.

6. The combination forest biomass and tree harvester of claim 1 wherein the grabbing assembly further comprises:
   a pair of primary grabber arms pivotably connected to the main portion of the frame member; and
   a pair of secondary grabber arms pivotably connected to the main portion of the frame member;
   wherein the pair of primary grabber arms are configured to hold, collect, or grab trees; and
   wherein the pair of secondary grabber arms are configured to hold, collect, or grab forest biomass.

7. The combination forest biomass and tree harvester of claim 1 wherein the self-propelled vehicle base is a prime mover.

8. The combination forest biomass and tree harvester of claim 1
   wherein the self-propelled vehicle is moveable on a ground of a forest area; and
   wherein the moveable arm is configured to manipulate the harvester head assembly as the self propelled vehicle moves between positions where the base portion of the frame member is substantially parallel to the ground of the forest area, positions where the base portion of the frame member is substantially perpendicular to the ground of the forest area, and intermediate positions.

9. A harvesting head assembly for harvesting forest biomass and trees, the harvesting head assembly comprising:
   a frame member comprising a base portion and a main portion, the main portion being substantially perpendicular to the base portion;
   a grabbing assembly comprising:
      a pair of primary grabber arms pivotably connected to the main portion of the frame member; and
      a pair of secondary grabber arms pivotably connected to the main portion of the frame member, the pair of primary grabber arms being substantially larger than the pair of secondary grabber arms;
   a cutting assembly attached to the base portion of the frame member, the cutting assembly comprising:
      a primary cutting mechanism positioned on a center axis, the primary cutting mechanism being configured to harvest trees; and a secondary cutting mechanism positioned in an orbital configuration around the primary cutting mechanism, the secondary cutting mechanism being configured to harvest forest biomass;

wherein the center axis is substantially perpendicular to the base portion of the frame member.

10. The harvesting head assembly of claim 9 wherein the pair of primary grabbers arms is configured to hold, collect, or grab trees and the pair of secondary grabber arms is configured to hold, collect, or grab forest biomass.

11. The harvesting head assembly of claim 9 wherein the primary cutting assembly comprises a primary saw disc and the secondary cutting assembly comprises two or more orbital saw discs, the two or more orbital saw discs each having a circumference that is substantially smaller than a circumference of the primary saw disc.

12. The harvesting head assembly of claim 11 wherein the two or more orbital saw discs comprise:

a first orbital saw disc having a first circumference, the first orbital saw disc being positioned on a first axis; and a second orbital saw disc having a second circumference, the second orbital saw disc being positioned on a second axis;

wherein the first circumference and the second circumference are both smaller than the primary circumference;

wherein the first axis is substantially parallel to the center axis; and wherein the second axis is substantially parallel to the center axis.

13. The harvesting head assembly of claim 9, further comprising grippers attached to the base portion of the frame member.

14. The harvesting head assembly of claim 9 wherein the frame member is substantially U-shaped.

15. A method for harvesting forest biomass and trees comprising the steps of:

moving a prime mover through a forest area, the prime mover comprising a harvesting head assembly, the harvesting head assembly comprising:

a frame member having a base portion and a main portion;

a grabbing assembly attached to the main portion of the frame member, the grabbing assembly comprising:

a pair of primary grabber arms pivotably connected to the main portion of the frame member; and a pair of secondary grabber arms pivotably connected to the main portion of the frame member, the pair of primary grabber arms being substantially larger than the pair of secondary grabber arms; and a cutting assembly attached to the base portion of the frame member, the cutting assembly comprising:

a primary cutting mechanism positioned on a center axis, the center axis being substantially perpendicular to the base portion of the frame member; and a secondary cutting mechanism positioned in an orbital configuration around the primary cutting mechanism, the secondary cutting mechanism comprising:

a first orbital saw disc; and a second orbital saw disc;

cutting trees with the primary cutting mechanism; and mowing forest biomass as the self-propelled vehicle moves.

16. The method of claim 15 wherein the step of mowing forest biomass comprises continuously rotating the secondary cutting mechanism.

17. The method of claim 16 wherein the step of mowing forest biomass further comprises continuously rotating the primary cutting mechanism.

18. The method of claim 15, further comprising the step of accumulating trees and forest biomass with the grabbing assembly of the harvester head.

19. The method of claim of claim 18 wherein the step of accumulating trees and forest biomass further includes accumulating trees with the pair of primary grabber arms and accumulating forest biomass with the pair of secondary grabber arms.

20. The method of claim 16 wherein the step of continuously rotating the secondary mechanism comprises:

rotating the first orbital saw disc in a clockwise direction; and rotating the second orbital saw disc in a counter clockwise direction.

* * * * *